J. H. WRIGHT.
ROLLING FENDER.
APPLICATION FILED OCT 10, 1919.
1,376,910.
Patented May 3, 1921.
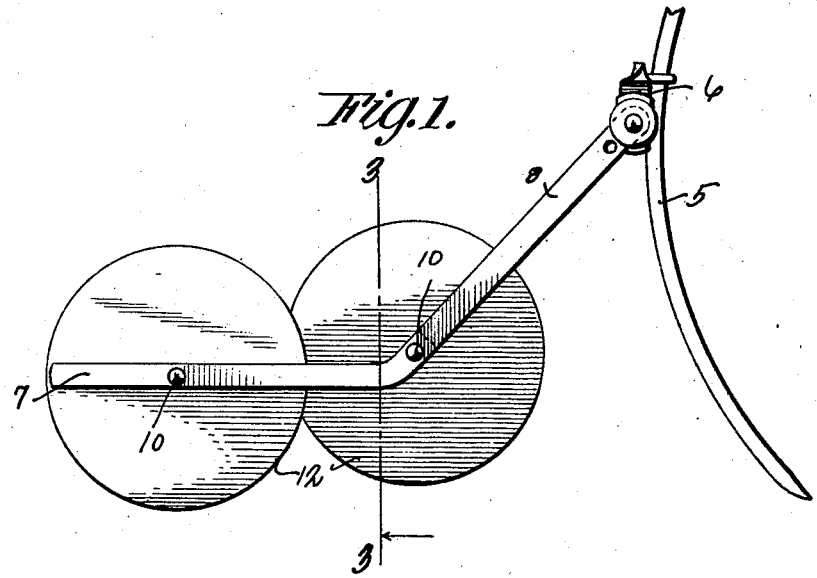
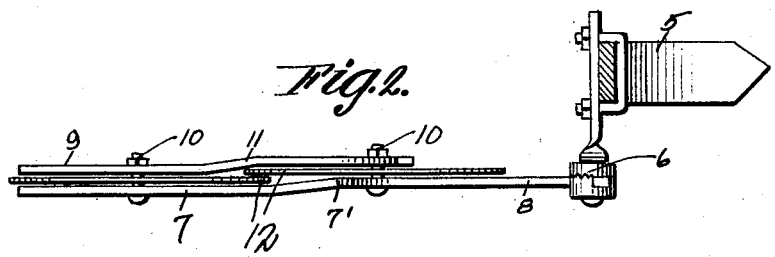
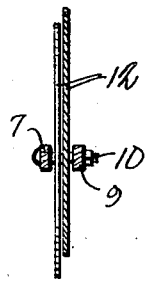
WITNESSES
Inventor
JOSEPH H. WRIGHT

UNITED STATES PATENT OFFICE.

JOSEPH HANSEL WRIGHT, OF HENDERSON, TEXAS.

ROLLING FENDER.

1,376,910.    Specification of Letters Patent.    Patented May 3, 1921.

Application filed October 10, 1919. Serial No. 329,798.

*To all whom it may concern:*

Be it known that I, JOSEPH H. WRIGHT, citizen of the United States, residing at Henderson, in the county of Rusk and State of Texas, have invented certain new and useful Improvements in Rolling Fenders, of which the following is a specification.

This invention relates to agricultural implements and more particularly to a fender for such devices.

One object of this invention is the production of a fender which may be attached to a cultivator or any other earth working device which is so arranged as to prevent clods of dirt from being thrown over and crushing small plants.

Another object of this invention is the production of a rolling fender wherein a plurality of disks are provided and are overlapped so as to prevent clods of dirt from being thrown over on small plants and at the same time will crush clods of dirt to, in a sense, mulsh the earth while the manner in which the disks overlap will cause the disks to clean each other and prevent earth from sticking thereon.

One practical form of construction and assembly of the present invention will be hereinafter described and is illustrated in the drawing, in which—

Figure 1 is a side elevation of the rolling fender.

Fig. 2 is a top plan view of the device.

Fig. 3 is a vertical section taken on the line 3—3 of Fig. 1.

In the preferred embodiment of the present invention, about to be specifically described, and for the purpose of illustration, it will be seen that a cultivator tooth is shown in general at 5 and may be provided with any suitable clamping means indicated in general at 6 for the purpose of connecting the rolling fender to the cultivator tooth.

A horizontally extended supporting bar 7 is provided and has an obliquely upwardly extending extension 8 connected to the clamp 6 as shown in Fig. 1. A reinforcing bar 9 is provided and is supported upon the supporting bar 7 by bolt and nut constructions as shown at 10 or by any other desired means, it being noted that the reinforcing bar is spaced from the supporting bar and that this reinforcing bar is offset slightly as shown at 11 intermediate its ends.

A flat enlarged disk 12 is rotatable upon each bolt 10, the disks being positioned between the supporting bar 7 and the reinforcing bar 9. These disks are arranged so that their peripheries overlap as shown in Figs. 1 and 2, and by offsetting the supporting bar 7 as at 7' and the reinforcing bar 9 at 11, sufficient space is provided for the overlapping of the disks as shown clearly in Fig. 2.

When the device is in use, it will be seen that the rolling fender will trail the tooth 5 of the cultivator. As the tooth digs into the ground and throws clods to one side these clods being thrown immediately in the rear of the tooth will strike against the advancing rolling fender and thus will be prevented from being thrown onto and injuring small plants. As the disks rotate, by their engagement with the ground, obviously upon striking these clods they will cut the clods to pieces and thus in a sense mulsh the earth to make the same comparatively fine. The manner in which the disks overlap and also pass between the supporting bar and the reinforcing bar will prevent any mud or other refuse from clinging to the disks as the same rotate, thus causing the peripheries of the disks as the disks move forwardly into engagement with the ground to be in a clean condition so as to efficiently guard the young plants passing beside these disks. This is brought about so that the peripheries of the disks as they dig into the ground will not have clods clinging to them which might be carried down beside the disks and furthermore so that the disks will be in condition to efficiently dig into and break up clods which are thrown against them, owing to their path of movement.

Thus it will be seen that a very simple and efficient rolling fender has been provided which will reduce friction and at the same time break up clods thrown there, against them and will also be in a position to prevent clods thrown over onto small plants which may be at this time cultivated by the device. Thus a simple and efficient device has been constructed of the character specified which may be produced at a very minimum expense and which may be operated at all times for the purposes set forth.

The foregoing description and the drawing has reference to the preferred or approved embodiment of my invention. It is to be understood however, that I may make such changes in construction and assembly of parts, materials, dimensions, etc., as may prove expedient and fall within the scope of the appended claims.

Having thus fully described my invention, what I claim as new and desire to secure by Letters Patent is:—

1. In a device of the character described, the combination of a supporting bar, and rotatable disks carried by said bar and overlapping each other, as and for the purposes set forth.

2. In a device of the character described, the combination of a horizontally extending supporting bar having an upwardly extended extension at its forward end, said supporting bar being offset intermediate its ends, bolts carried by said supporting bar beyond each side of the offset portion, a reinforcing bar carried upon said bolts, and provided with an offset portion intermediate its ends substantially in transverse alinement with the offset portion of said supporting bar, disks rotatably mounted upon said bolts and overlapping each other, thus causing the disks to be positioned between said bars and to overlap contiguous to the offset portions of said bars, as and for the purposes set forth.

In testimony whereof I affix my signature in presence of two witnesses.

JOSEPH HANSEL WRIGHT.

Witnesses:
J. L. WELCH,
EDGAR STRONG.